[12] United States Patent
Zhang et al.

(10) Patent No.: US 10,846,186 B2
(45) Date of Patent: Nov. 24, 2020

(54) CENTRAL PROCESSING UNIT CPU HOT-REMOVE METHOD AND APPARATUS, AND CENTRAL PROCESSING UNIT CPU HOT-ADD METHOD AND APPARATUS

(71) Applicant: Huawei Technologies Co., Ltd., Shenzhen (CN)

(72) Inventors: Fei Zhang, Hangzhou (CN); Defu Liao, Hangzhou (CN); Zhangping Ma, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 15/863,350

(22) Filed: Jan. 5, 2018

(65) Prior Publication Data

US 2018/0129574 A1 May 10, 2018

Related U.S. Application Data

(63) Continuation of application No. PCT/CN2016/098741, filed on Sep. 12, 2016.

(30) Foreign Application Priority Data

Jan. 8, 2016 (CN) .......................... 2016 1 0016926

(51) Int. Cl.
*G06F 11/20* (2006.01)
*G06F 11/14* (2006.01)
(Continued)

(52) U.S. Cl.
CPC ........ *G06F 11/2028* (2013.01); *G06F 9/5027* (2013.01); *G06F 11/1425* (2013.01);
(Continued)

(58) Field of Classification Search
CPC ............. G06F 11/2028; G06F 11/1425; G06F 11/1428; G06F 11/20; G06F 11/2041;
(Continued)

(56) References Cited

U.S. PATENT DOCUMENTS 5,367,636 A * 11/1994 Colley .............. G06F 15/17343
370/400
5,909,558 A * 6/1999 Linzmeier ............. G06F 13/374
710/107
(Continued)

FOREIGN PATENT DOCUMENTS

CN 1491386 A 4/2004
CN 101216793 A 7/2008
(Continued)

OTHER PUBLICATIONS

International Preliminary Report on Patentability, dated Jul. 2018.*
(Continued)

*Primary Examiner* — Paul Contino
(74) *Attorney, Agent, or Firm* — Slater Matsil, LLP

(57) ABSTRACT

A central processing unit (CPU) hot-remove method, including determining, by a controller of a server that has a non-full mesh first CPU topology comprising multiple CPUs, a first CPU of the multiple CPUs to be removed from the first CPU topology according to first indication information, determining at least one second CPU associated in the first CPU topology with the first CPU, where the at least one second CPU and the first CPU meet a preset condition associated with a relationship between the first CPU and the at least one second CPU, and sending second indication information to the first CPU topology, the second indication information instructing the first CPU topology to remove the
(Continued)

first CPU and the at least one second CPU, resulting in a second CPU topology without the first CPU and other than the at least one second CPU.

20 Claims, 9 Drawing Sheets

(51) Int. Cl.
  *G06F 9/50* (2006.01)
  *G06F 13/40* (2006.01)
  *G06F 13/42* (2006.01)
(52) U.S. Cl.
  CPC .......... *G06F 11/1428* (2013.01); *G06F 11/20* (2013.01); *G06F 11/2041* (2013.01); *G06F 11/2097* (2013.01); *G06F 13/4081* (2013.01); *G06F 13/4282* (2013.01); *G06F 2201/805* (2013.01)
(58) Field of Classification Search
  CPC ............... G06F 11/2097; G06F 9/5027; G06F 2201/805; G06F 13/4081; G06F 13/4282
  See application file for complete search history.

(56) References Cited

U.S. PATENT DOCUMENTS

| | | | |
|---|---|---|---|
| 6,282,596 B1 | 8/2001 | Bealkowski et al. | |
| 9,336,179 B2* | 5/2016 | Liu | G06F 15/17337 |
| 9,916,236 B2* | 3/2018 | Takai | G06F 12/06 |
| 10,503,684 B2* | 12/2019 | Sharma | G06F 13/4282 |
| 2002/0078290 A1 | 6/2002 | Derrico et al. | |
| 2004/0153704 A1 | 8/2004 | Bragulla et al. | |
| 2004/0215865 A1 | 10/2004 | Arimilli et al. | |
| 2006/0150187 A1* | 7/2006 | Vaddagiri | G06F 9/4843 |
| | | | 718/102 |
| 2006/0274372 A1 | 12/2006 | Qutub et al. | |
| 2007/0180288 A1 | 8/2007 | Okada et al. | |
| 2009/0144476 A1* | 6/2009 | Cai | G06F 13/4063 |
| | | | 710/302 |
| 2011/0179311 A1* | 7/2011 | Nachimuthu | G06F 11/3676 |
| | | | 714/42 |
| 2012/0151107 A1* | 6/2012 | Cai | H04L 45/02 |
| | | | 710/107 |
| 2014/0068603 A1 | 3/2014 | Tsirkin et al. | |
| 2014/0108878 A1* | 4/2014 | Liu | H04L 1/16 |
| | | | 714/748 |
| 2014/0369180 A1* | 12/2014 | Shimokawa | H04L 12/10 |
| | | | 370/217 |
| 2015/0331822 A1* | 11/2015 | Takai | G06F 12/06 |
| | | | 710/316 |
| 2016/0132356 A1* | 5/2016 | Kozawa | G06F 9/50 |
| | | | 713/100 |
| 2017/0364475 A1* | 12/2017 | Liu | G06F 15/17343 |
| 2018/0129574 A1* | 5/2018 | Zhang | G06F 11/20 |

FOREIGN PATENT DOCUMENTS

| | | |
|---|---|---|
| CN | 103412836 A | 11/2013 |
| CN | 103425545 A | 12/2013 |
| CN | 103699444 A | 4/2014 |
| CN | 104375881 A | 2/2015 |
| CN | 105700975 A | 6/2016 |
| EP | 2605451 A1 | 6/2013 |

OTHER PUBLICATIONS

European Search Opinion, dated Oct. 2018.*
How the Intel Xeon Platinum is a Marketing Headache. Jul. 3, 2018 [retrieved on Jul. 2, 2020]. Retrieved from the Internet: <URL: https://www.servethehome.com/how-the-intel-xeon-platinum-is-a-marketing-headache/>.*
Watts, David et al. IBM eX5 Portfolio Overview IBM System x3850 X5, x3950 X5, x3690 X5, and BladeCenter HX5. Apr. 2013. IBM.*
Cutrass, Ian. Lenovo's New Cascade Lake ThinkSystem Servers: Up to 8 Sockets with Optane. Apr. 2, 2019 [retrieved on Jul. 2, 2020]. Retrieved from the Internet: <URL: https://www.anandtech.com/show/14152/lenovos-new-cascade-lake-thinksystem-servers-up-to-8-sockets-with-optane>.*

* cited by examiner

CENTRAL PROCESSING UNIT CPU HOT-REMOVE METHOD AND APPARATUS, AND CENTRAL PROCESSING UNIT CPU HOT-ADD METHOD AND APPARATUS

CROSS-REFERENCE TO RELATED APPLICATIONS

This application is a continuation of International Application No. PCT/CN2016/098741, filed on Sep. 12, 2016, which claims priority to Chinese Patent Application No. 201610016926.9, filed on Jan. 8, 2016. The disclosures of the aforementioned applications are hereby incorporated by reference in their entireties.

TECHNICAL FIELD

The present disclosure relates to multi-CPU interconnection technologies, and in particular, to a central processing unit (CPU) hot-remove method and apparatus, and a CPU hot-add method and apparatus.

BACKGROUND

With rapid development of the Internet Technology (IT), amounts of data in various IT systems increase. For example, some servers are currently applied to key enterprise services, and because these services are crucial to an enterprise application, data and information processed by the servers are core business data and information of a user, amounts of which are usually massive. For three major types of applications, on-line transaction, business analysis, and a database that are currently most common in some key service fields, even if the three major types of applications are applied to an ordinary enterprise, an amount of data processed in the three major types of applications may be astonishing, not to mention that data at a terabyte (TB) or petabyte (PB) scale needs to be processed when the three major types of applications run in industries such as banking, telecommunications, and securities. Data at such a scale and relations to production, operation, and decision-making efficiency of a business user certainly require a bearing platform to have an extraordinary high-performance processing capability. In addition, with the rise of a large-scale memory database application such as a HANA (High-Performance Analytic Appliance), which is analysis software, an extremely high requirement is posed to a memory capacity of a system with a single server. Therefore, more CPUs and more memories need to be integrated into the single server, so as to meet requirements of high performance and a large capacity that are required for service running.

Therefore, a multi-CPU interconnection technology is developed, that is, multiple CPUs are interconnected using high-speed interconnection channels (for example, a Quick Path Interconnect (QPI)) between the CPUs, such that the multiple physical CPUs can interconnect using these high-speed interconnection channels and form a resource-sharing server system. However, some extra risks are caused while the multiple CPUs interconnect to improve processing performance of a single server, because the entire system may crash if any CPU in the multi-CPU interconnection system is faulty. If the CPU fault needs to be fixed, the entire server system needs to be powered off, then the CPU is changed, and the operation of powering off the entire server system and changing the CPU certainly causes system service interruption, thereby severely affecting continuous serving time of the system.

SUMMARY

Embodiments of the present disclosure provide a central processing unit CPU hot-remove method and apparatus, and a central processing unit CPU hot-add method and apparatus, such that a CPU can be changed without powering-off, and a system can work normally, thereby improving user experience.

In an aspect, an embodiment of this application provides a central processing unit CPU hot-remove method. The method is applicable to a server that has a non-full mesh first CPU topology, the server includes a controller, the currently running first CPU topology includes multiple CPUs. The method may include determining, by the controller, a first CPU from the multiple CPUs, where the first CPU is a CPU that is faulty or that needs to be removed according to first indication information, and the first indication information is from the first CPU topology or a user interface, determining, by the controller, at least one second CPU from the multiple CPUs, where the at least one second CPU and the first CPU meet a preset condition, and sending, by the controller, second indication information to the first CPU topology, where after the first CPU topology receives the second indication information, the first CPU and the at least one second CPU are removed, so as to obtain a second CPU topology and run the second CPU topology. In this embodiment of the present disclosure, in-service CPU removal can be achieved, and during a CPU removing process and after the CPU is removed, a system can work normally, thereby improving user experience.

In a possible design, multiple CPUs in the first CPU topology may be connected using an intermediate node, and the intermediate node includes a CPU and/or an external node controller XNC. In this embodiment of the present disclosure, a CPU in the CPU topology connected using the intermediate node can be removed online, and the system can work normally, thereby improving user experience.

In a possible design, the determining, by the controller, at least one second CPU from the multiple CPUs, where the at least one second CPU and the first CPU meet a preset condition may include that each CPU in the server may have at least one standby CPU, and the controller may determine at least one standby second CPU of the first CPU. The at least one standby second CPU is in the first CPU topology. According to the present disclosure, during CPU removing, both the CPU that needs to be removed and the standby CPU may be removed, such that the topology obtained after the CPUs are removed is still stable. The CPUs are removed in a case in which normal system operating is ensured, thereby improving user experience.

In a possible design, the determining, by the controller, at least one second CPU from the multiple CPUs, where the at least one second CPU and the first CPU meet a preset condition may include: determining, by the controller, a location of the first CPU in the first CPU topology, and a second CPU that is in the first CPU topology and that is in at least one location symmetrical (for example, centrally symmetrical or axially symmetrical) to that of the first CPU, or any second CPU that is in at least one location symmetrical to that of the first CPU and that is directly connected to the first CPU. In this embodiment of the present disclosure, after the CPU and all CPUs or any CPU in a location symmetrical to that of the CPU are removed, a stable topology structure can be obtained, and normal system operating can be ensured, thereby improving user experience.

In a possible design, each CPU has multiple ports, the multiple CPUs are connected using the ports, and the determining, by the controller, at least one second CPU from the multiple CPUs, where the at least one second CPU and the first CPU meet a preset condition may further include determining, by the controller, at least one second CPU interconnected with the first CPU using ports of a same port number. For example, a CPU has three ports, and port numbers are respectively 0, 1, and 2, and if two CPUs are connected both using ports 2, when one CPU needs to be removed, the other CPU also needs to be removed. In this embodiment of the present disclosure, CPUs that need to be removed together can be determined using the ports, such that a stable CPU topology is obtained and normal system operating is ensured, thereby improving user experience.

In a possible design, the first CPU topology includes multiple CPU groups, information about the multiple CPU groups may be pre-stored in the server, and the determining, by the controller, at least one second CPU from the multiple CPUs, where the at least one second CPU and the first CPU meet a preset condition may include determining, by the controller, at least one second CPU belonging to a same CPU group as the first CPU. In this embodiment of the present disclosure, CPUs can be removed in a manner of a group, such that a stable CPU topology can be obtained and normal system operating can be ensured, thereby improving user experience.

In a possible design, after the first CPU topology receives the second indication information, resources are reclaimed from the first CPU and the at least one second CPU, and the first CPU and the at least one second CPU are disconnected from a CPU in the second CPU topology; and settings of CPUs in the second CPU topology may be further adjusted, such that remaining CPUs can work in a form of a stable second CPU topology after the first CPU and the at least one second CPU are removed. In this embodiment of the present disclosure, the CPU topology obtained after the CPUs are removed can work normally, thereby improving user experience.

In another aspect, an embodiment of this application provides a central processing unit CPU hot-add method. The method is applicable to a server that has a non-full mesh third CPU topology, the server includes a controller, and the method may include determining, by the controller, first indication information, where the first indication information is used to instruct to add a third CPU, and the third CPU is not in the currently running third CPU topology; determining, by the controller, whether at least one fourth CPU is installed, where the at least one fourth CPU and the third CPU meet a preset condition; and sending, by the controller, second indication information to the third CPU topology when the at least one fourth CPU is installed. After the third CPU topology receives the second indication information, the third CPU and the at least one fourth CPU are added, so as to obtain a fourth CPU topology and run the fourth CPU topology. In this embodiment of the present disclosure, a CPU can be added online, and during an adding process, a system can work normally, thereby improving user experience.

In a possible design, the first indication information may be received using a user interface, and the indication information may carry an identifier of the CPU that needs to be added, or after the third CPU is installed, a sensor triggers a particular instruction, and the controller obtains an identifier of the third CPU according to the instruction. In this embodiment of the present disclosure, CPU adding may be triggered using the particular instruction and the user interface, and the system can work normally, thereby improving user experience.

In a possible design, the determining, by the controller, whether at least one fourth CPU is installed, where the at least one fourth CPU and the third CPU meet a preset condition includes determining, by the controller, whether a fourth CPU that is in the fourth CPU topology and that is in at least one location symmetrical (centrally symmetrical or axially symmetrical) to that of the third CPU is installed. In this embodiment of the present disclosure, when a CPU is added, a CPU whose location is symmetrical to that of the CPU is also added. In this way, a stable topology is obtained after the CPUs are added, and the system can work normally during this adding process, thereby improving user experience.

In a possible design, the determining, by the controller, whether at least one fourth CPU is installed, where the at least one fourth CPU and the third CPU meet a preset condition includes: determining, by the controller, whether at least one standby CPU of the third CPU is installed. In this embodiment of the present disclosure, both the CPU and the standby CPU can be installed, and the CPU topology is expanded in a case in which an operating system can work normally, thereby improving user experience.

In a possible design, the fourth CPU topology includes multiple CPU groups, information about the multiple CPU groups may be pre-stored in the server, and the determining, by the controller, whether at least one fourth CPU is installed, where the at least one fourth CPU and the third CPU meet a preset condition may include determining, by the controller, whether at least one fourth CPU belonging to a same CPU group as the third CPU is installed. In this embodiment of the present disclosure, during CPU adding, the CPUs are added in unit of a group. In this way, it is ensured that the topology obtained after the CPUs are added is still a stable topology, and the system can work normally, thereby improving user experience.

In a possible design, after receiving the second indication information, the third CPU topology allocates resources to the third CPU and the at least one fourth CPU, and establishes connections from the third CPU and the at least one fourth CPU to a CPU in the third CPU topology; and may further adjust settings of CPUs in the third CPU topology, so as to obtain the fourth CPU topology and run the fourth CPU topology. In this embodiment of the present disclosure, the CPU topology obtained after the CPUs are added is a stable topology, and normal system operating is ensured, thereby improving user experience.

In another aspect, an embodiment of this application provides a central processing unit CPU hot-remove apparatus, where the apparatus is applicable to a server that has a non-full mesh first CPU topology, the currently running first CPU topology includes multiple CPUs, and the apparatus includes a processing unit, configured to determine a first CPU from the multiple CPUs, where the first CPU is a CPU that is faulty or that needs to be removed according to first indication information, and the first indication information is from the first CPU topology or a user interface, where the processing unit is further configured to determine at least one second CPU from the multiple CPUs, where the at least one second CPU and the first CPU meet a preset condition, and a sending unit, configured to send second indication information to the first CPU topology, where the second indication information is used to instruct to remove the first CPU and the at least one second CPU, so as to obtain a second CPU topology and run the second CPU topology.

In a possible design, the processing unit is further configured to: determine a location of the first CPU in the first CPU topology, and a second CPU that is in the first CPU topology and that is in at least one location symmetrical to that of the first CPU, or any second CPU that is in a CPU in at least one location symmetrical to that of the first CPU and that is directly connected to the first CPU.

In a possible design, each CPU has multiple ports, the multiple CPUs are connected using the ports, and the processing unit is further configured to determine at least one second CPU interconnected with the first CPU using ports of a same port number.

In a possible design, the first CPU topology includes multiple CPU groups, information about the multiple CPU groups is pre-stored in the server, and the processing unit is further configured to determine at least one second CPU belonging to a same CPU group as the first CPU.

In a possible design, that the second indication information is used to instruct to remove the first CPU and the at least one second CPU includes: the second indication information is used to instruct to reclaim resources from the first CPU and the at least one second CPU, and disconnect the first CPU and the at least one second CPU from a CPU in the second CPU topology.

In still another aspect, an embodiment of this application provides a central processing unit CPU hot-add apparatus, where the apparatus is applicable to a server that has a non-full mesh third CPU topology, and the apparatus includes: a processing unit, configured to determine first indication information, where the first indication information is used to instruct to add a third CPU, and the third CPU is not in the currently running third CPU topology; where the processing unit is further configured to determine whether at least one fourth CPU is installed, where the at least one fourth CPU and the third CPU meet a preset condition; and a sending unit, configured to, when the at least one fourth CPU is installed, send second indication information to the third CPU topology, where the second indication information is used to instruct to add the third CPU and the at least one fourth CPU, so as to obtain a fourth CPU topology and run the fourth CPU topology.

In a possible design, the apparatus further includes: a first receiving unit, configured to receive third indication information using a user interface, where the third indication information includes an identifier of the third CPU; or a second receiving unit, configured to receive, using a sensor, fourth indication information triggered when the third CPU is installed; where the processing unit is further configured to determine the installed third CPU according to the fourth indication information.

In a possible design, the processing unit is further configured to: determine whether a fourth CPU that is in the fourth CPU topology and that is in at least one location symmetrical to that of the third CPU is installed.

In a possible design, the fourth CPU topology includes multiple CPU groups, information about the multiple CPU groups is pre-stored in the server, and the processing unit is further configured to: determine whether at least one fourth CPU belonging to a same CPU group as the third CPU is installed.

In a possible design, that the second indication information is used to instruct to add the third CPU and the at least one fourth CPU includes the second indication information is used to instruct to allocate resources to the third CPU and the at least one fourth CPU, and establish connections from the third CPU and the at least one fourth CPU to a CPU in the third CPU topology, so as to obtain the fourth CPU topology and run the fourth CPU topology.

In still another aspect, an embodiment of this application provides a server that has a CPU topology structure, and the server includes a non-full mesh first CPU topology, a controller, and a memory. The memory is configured to store an instruction for the foregoing first aspect, and the controller and the first CPU topology are configured to execute the instruction.

In still another aspect, an embodiment of this application provides a server that has a CPU topology structure, and the server includes a non-full mesh third CPU topology, a controller, and a memory. The memory is configured to store an instruction for the foregoing second aspect, and the controller and the third CPU topology are configured to execute the instruction.

In still another aspect, an embodiment of this application provides a server that has a CPU topology structure, the structure includes slots, and an independently pluggable CPU is installed in the slot. The slots are connected using an interconnection channel. The multiple CPUs installed in the slots work as a first CPU topology structure. The server further includes a controller, and the controller is configured to perform the steps in the foregoing first aspect.

In still another aspect, an embodiment of this application provides a multipath server that has a CPU topology structure, the structure includes slots, and an independently pluggable CPU is installed in the slot. The slots are connected using an interconnection channel. The multiple CPUs installed in the slots work as a third CPU topology structure. The server further includes a controller, and the controller is configured to perform the steps in the foregoing second aspect.

In still another aspect, an embodiment of the present disclosure provides a computer storage medium. The computer storage medium is configured to store a computer software instruction used in the foregoing first aspect, and includes a program designed for executing the foregoing aspect.

In still another aspect, an embodiment of the present disclosure provides a computer storage medium. The computer storage medium is configured to store a computer software instruction used in the foregoing second aspect, and includes a program designed for executing the foregoing aspect.

According to the CPU hot-remove method and apparatus, and the CPU hot-add method and apparatus that are provided in the embodiments of the present disclosure, the CPU can be added or removed online, the topology obtained after removing or adding is still a stable topology, and normal system operating is not affected, thereby improving user experience.

DETAILED DESCRIPTION OF ILLUSTRATIVE EMBODIMENTS

To provide thorough understanding of the present disclosure, the following further describes the embodiments of the present disclosure in detail with reference to the accompanying drawings. The foregoing embodiments are not intended to limit the protection scope of the present disclosure.

Figure 1:
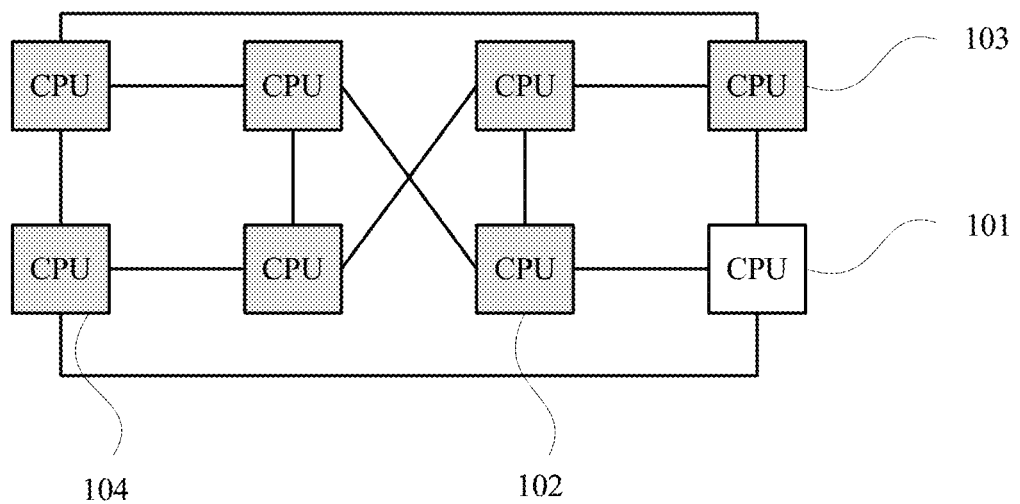
FIG. 1 is a schematic diagram of a CPU topology structure.

FIG. 1 is a schematic diagram of a CPU topology structure. As shown in FIG. 1, the CPU topology structure may use an Intel processor (Intel Xeon Processor), and the Intel processor includes eight CPUs. The CPUs are connected using high-speed interconnection channels, and FIG. 1 shows a stable topology structure.

Figure 2:
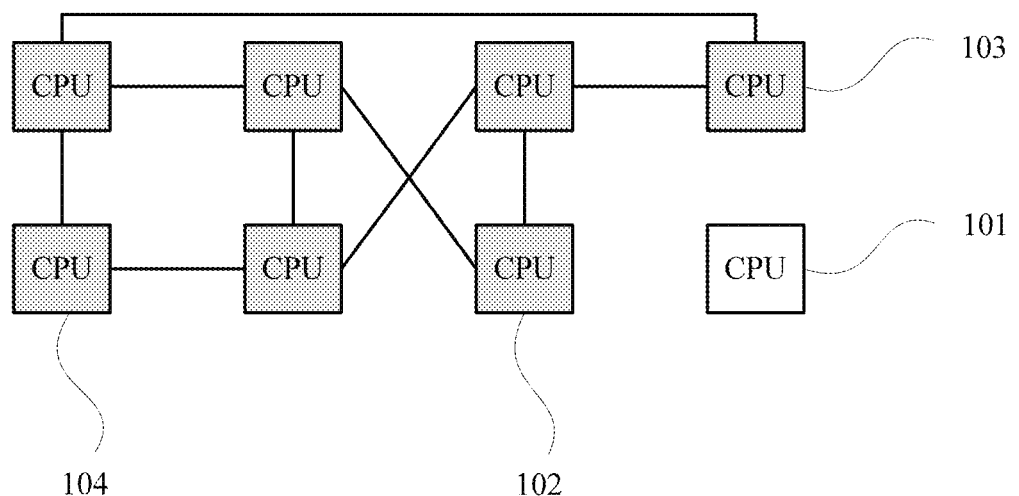
FIG. 2 is a schematic diagram of another CPU topology structure.

In a CPU topology running process, when one CPU is faulty, generally not only the CPU cannot process data, but also all channels connected to the CPU may be faulty. For example, when a CPU 101 shown in FIG. 1 is faulty, a connection between the CPU 101 and a CPU 102, a connection between the CPU 101 and a CPU 103, and a connection between the CPU 101 and a CPU 104 are all faulty. As shown in FIG. 2, FIG. 2 is a schematic diagram of remaining connections that exist when the CPU 101 is faulty. However, a manner in which the seven CPUs are connected shown in FIG. 2 indicates an unstable topology structure. During running, a system fault or crash may be caused.

Figure 3:
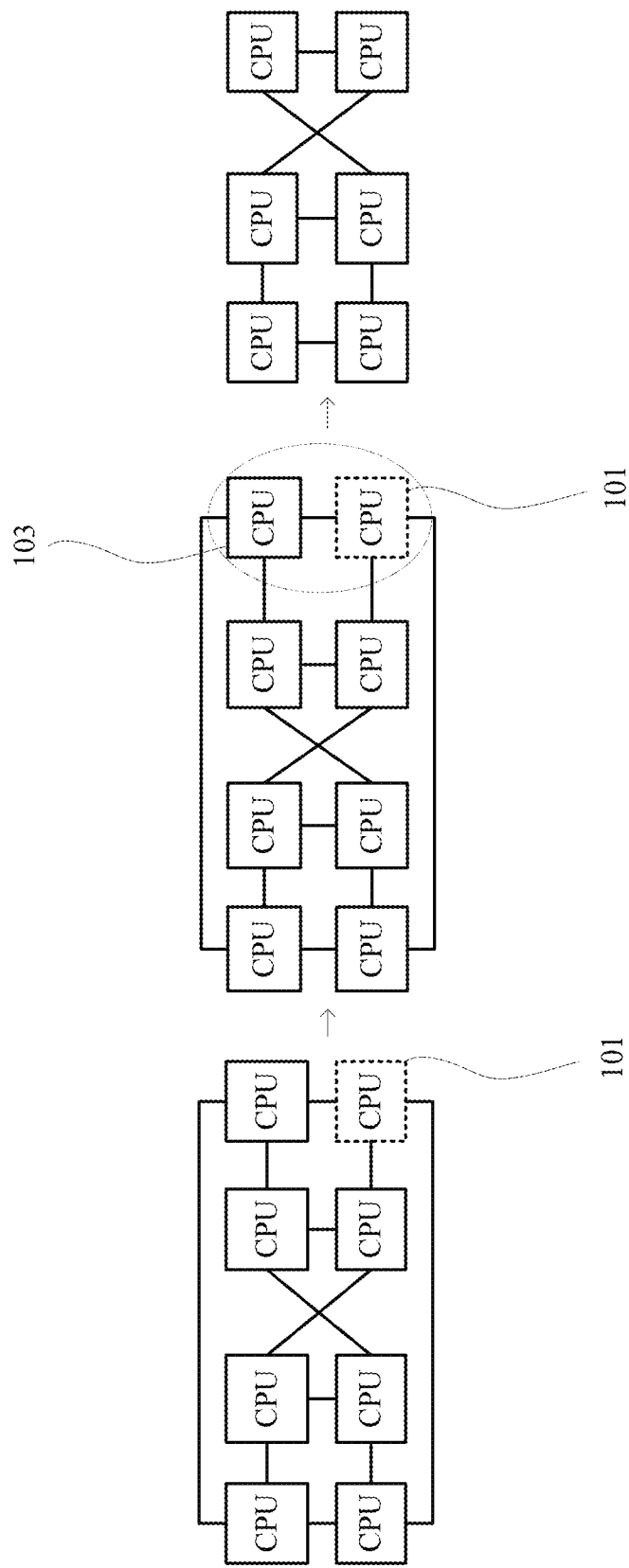
FIG. 3 is a schematic diagram of a CPU removing process according to an embodiment of the present disclosure.

An inventor of this application realizes the problem, and finds, by analyzing, that as shown in FIG. 3, when the CPU 101 needs to be removed, the CPU 103 corresponding to the CPU 101 may be also removed, and in this way, a stable topology structure having six CPUs can be obtained.

Figure 4:
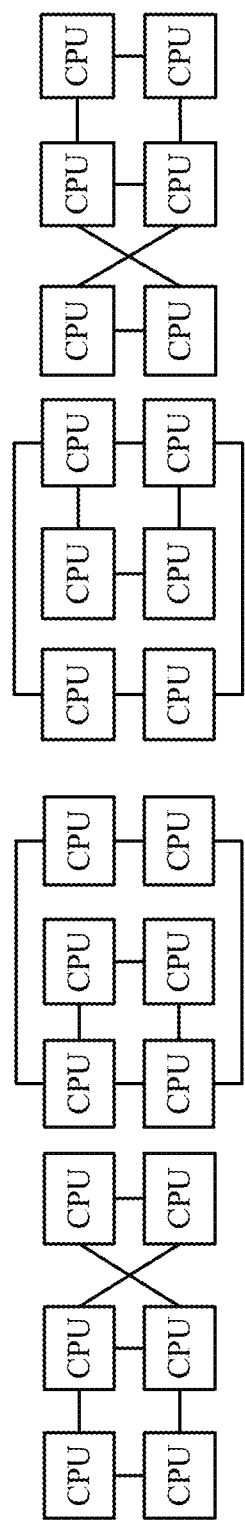
FIG. 4 is a schematic diagram of still another CPU topology structure.
Figure 5:
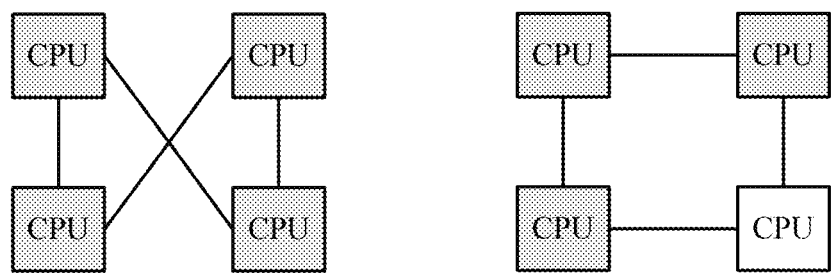
FIG. 5 is a schematic diagram of yet another CPU topology structure.

Therefore, a group of CPUs to which the CPU belongs may be removed to obtain a stable topology structure having fewer than eight CPUs. As shown in FIG. 4, a topology structure having six CPUs may be obtained, or as shown in FIG. 5, a topology structure having four CPUs may be obtained, and so on. The structure in FIG. 4 may be obtained by removing two CPUs in the structure in FIG. 1, and the structure in FIG. 5 may be obtained by removing four CPUs in the structure in FIG. 1. That is, a stable topology structure may be obtained by removing a group of CPUs in a CPU topology structure, and accordingly, a stable topology structure may be obtained by adding a group of CPUs to a CPU topology structure.

Figure 6:
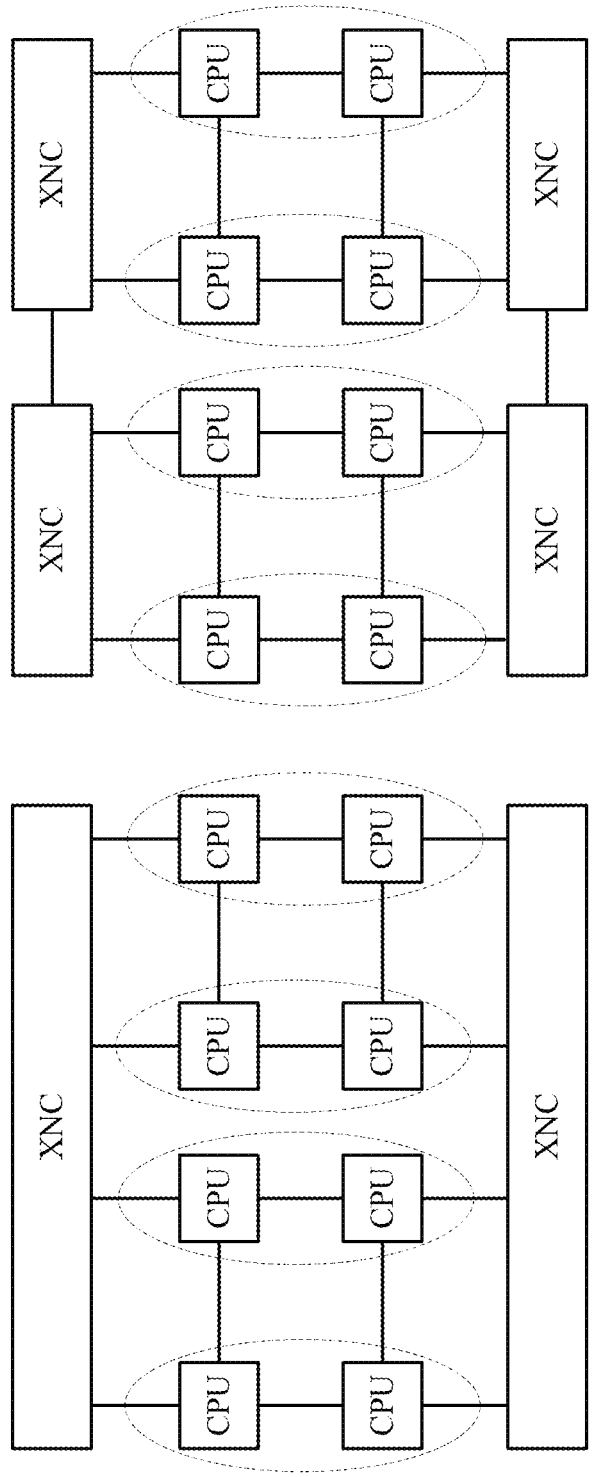
FIG. 6 is a schematic diagram of yet another CPU topology structure.

FIG. 6 is a schematic diagram of a CPU topology structure. As shown in FIG. 6, the CPU topology structure includes eight CPUs, and the CPUs are connected using high-speed interconnection channels or external node controller (XNC)s. FIG. 6 provides two connection manners using the XNC, but the foregoing problem exists in either connection manner, that is, when one CPU is faulty, connections between remaining seven CPUs are an unstable topology structure. However, whichever CPU is faulty, a CPU corresponding to the faulty CPU can be found, and after the two CPUs are removed, a stable topology structure having six CPUs is obtained.

It should be learned that, the stable topology structure having eight CPUs is merely used as an example, and a stable topology structure having another quantity of CPUs also has this feature. For clarity of description, the common stable topology structure having eight CPUs is used.

Figure 7:
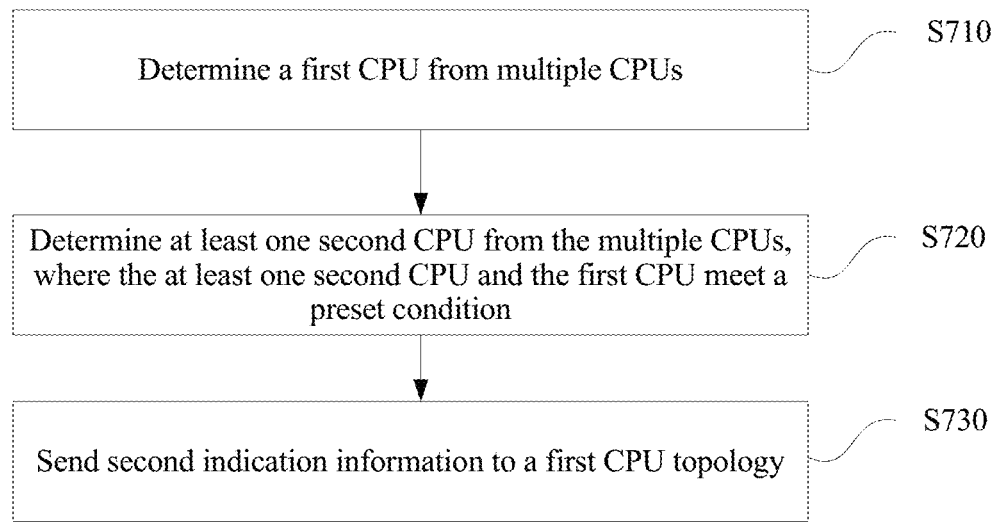
FIG. 7 is a schematic diagram of a central processing unit CPU hot-remove method according to an embodiment of the present disclosure.

FIG. 7 is a schematic diagram of a central processing unit CPU hot-remove method according to an embodiment of the present disclosure. As shown in FIG. 3, the method may be performed for a server that has a non-full mesh first CPU topology. An instruction for the following further steps may be executed by a particular CPU in the first CPU topology, or may be executed by another CPU or a controller different from that in the first CPU topology, and the instruction required for executing the following steps may be stored in a memory. The CPU topology of the server includes multiple CPUs, and the method may include the following steps.

S710. Determine a first CPU from the multiple CPUs, where the first CPU is a CPU that is faulty or that needs to be removed according to first indication information, and the first indication information is from the first CPU topology or a user interface.

The server may run a service system and a control system, and the service system may perform detection, and determine a CPU that is at risk or that is faulty. The service system is a system that runs on the first CPU topology and that mainly processes a service task, and the control system may be a system that runs on a particular CPU or a controller in the CPU topology and that is mainly used to control the CPU topology.

Alternatively, in a first CPU topology running process, when there are a relatively small quantity of tasks and some CPUs need to be stopped from working to save resources, the first CPU topology determines the CPUs that need to be stopped from working. The first CPU topology sends the first indication information to the controller, so as to notify the controller of an identifier of a CPU that needs to be removed. A CPU whose durability or other performance is relatively poor may be removed according to performance of the CPUs.

Alternatively, the controller may receive the first indication information using the user interface. For example, when a CPU needs to be changed, a user may input, using the user interface, an identifier of the CPU that needs to be changed.

The controller may further detect the CPUs in the first topology to determine the faulty CPU, for example, may detect whether the CPU can be normally powered on.

In addition, identifiers of the CPUs may be used to distinguish different CPUs, and the identifier of the CPU may be information that can identify the CPU, for example, a socket ID.

It should be noted that, for clarity of description, another CPU or a controller different from that in the foregoing first CPU topology is collectively referred to as the controller.

S720. Determine at least one second CPU from the multiple CPUs, where the at least one second CPU and the first CPU meet a preset condition.

Figure 8:
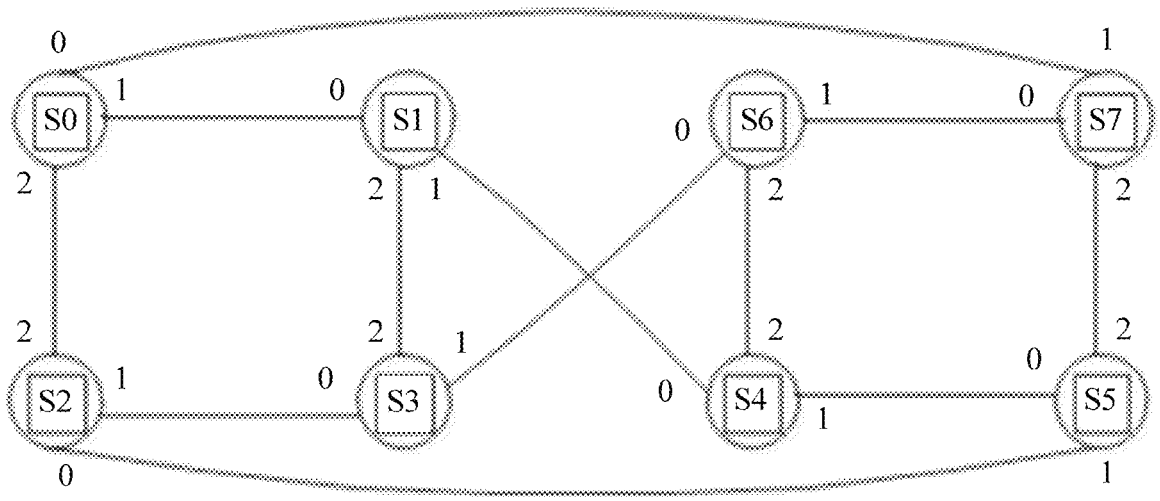
FIG. 8 is a schematic diagram of yet another CPU topology structure.

When the at least one second CPU is determined from the multiple CPUs, where the at least one second CPU and the first CPU meet the preset condition, there may be the following implementations:

Manner 1: CPUs in a same topology structure may have the same type. A CPU module generally has multiple ports, and the ports on the CPU may have different port numbers. However, different CPUs of the same type have same port numbers, and CPUs interconnected using ports of a same port number may be determined as a CPU group. When determining the at least one second CPU from the multiple CPUs, where the at least one second CPU and the first CPU meet the preset condition, the controller may determine at least one second CPU interconnected with the first CPU using ports of a same port number. For example, as shown in FIG. 8, the topology structure indicates a topology having eight CPUs, where X (X=0, 1, . . . , and 7) in SX represents a socket ID. In addition, 0, 1, and 2 at two ends of each connected line actually represent QPI port numbers. It may be learned from FIG. 8 that, CPU groups including CPUs connected using ports of a same port number are respectively: S0 and S2, S1 and S3, S4 and S6, and S5 and S7. So and S2 are connected using ports 2, S1 and S3 are connected using ports 2, S4 and S6 are connected using ports 2, and S5 and S7 are connected using ports 2, and each pair of those form a CPU group. When S5 is faulty, a CPU, that is, S7, connected to the port 2 is found, both S5 and S7 are removed, and the remaining CPUs may form a stable topology structure. It should be noted that, the CPUs are grouped according to a stable topology structure rule.

Manner 2: The controller determines a location of the first CPU in the first CPU topology, and a second CPU that is in the first CPU topology and that is in at least one location symmetrical to that of the first CPU, or any second CPU that is in at least one location symmetrical to that of the first CPU and that is directly connected to the first CPU. Symmetry may be central symmetry or axial symmetry. For example, in the topology in FIG. 3, there are three CPUs in locations symmetrical to that of the CPU 101, two CPUs of the three CPUs are in locations axially symmetrical to that of the CPU 101, and one CPU of the three CPUs is in a location centrally symmetrical to that of the CPU 101. All the three CPUs may be removed, or any CPU directly connected to the CPU 101 may be removed only.

Manner 3: Each CPU in the server may have at least one standby CPU, and the controller may determine at least one standby second CPU of the first CPU, for example, may group the CPUs in the first CPU topology, and pre-store information about a CPU group in the server; and the controller may determine at least one second CPU belonging to a same CPU group as the first CPU. For another example, each two of CPUs in the topology shown in FIG. 6 may be grouped into a group, so as to form four groups; and identifiers of corresponding CPUs in these CPU groups may be stored, and when one CPU that needs to be removed is determined, the other CPU whose identifier is correspondingly stored is found, and both the CPUs are removed.

The service system in the server may determine the at least one second CPU, where the at least one second CPU and the first CPU meet the preset condition. Optionally, the service system in the server sends, to the control system (for example, an operating system (OS), a basic input/output system (BIOS), a baseboard management controller (BMC), or another software), an identifier of a CPU that needs to be removed, and the control system determines a second CPU topology that does not include the first CPU, and sends, to the service system, identifiers of CPUs that need to be removed. The service system removes the corresponding CPUs, so as to obtain the second CPU topology.

S730. Send second indication information to the first CPU topology, where the second indication information is used to instruct to remove the first CPU and the at least one second CPU, so as to obtain the second CPU topology and run the second CPU topology.

After the CPUs are removed, the server needs to work based on the second CPU topology, for example, may run the service system on the second CPU topology.

It should be noted that removing a CPU includes: The system reclaims resources allocated to the CPU, for example, releases the resources allocated to the CPU or moves, to another CPU or another CPU topology, the resources allocated to the CPU, for example, moves the resources to the second CPU topology; the system may further delete logical connections between the CPU that needs to be removed and CPUs in the second CPU topology, that is, remaining CPUs that exist after the CPU that needs to be removed is removed; and the system may further reset the CPUs in the second CPU topology, such that the CPUs can work as the second CPU topology. Further, the CPU that needs to be removed may be further powered off. In the foregoing manner, information for the first CPU and the at least one second CPU does not exist in the CPUs in the second CPU topology, that is, when the system is running, a task that needs to be performed by the first CPU or the at least one second CPU does not exist, and channels to the first CPU and the at least one second CPU are disconnected. Therefore, the second CPU topology can stably run.

In a further implementation of this embodiment of the present disclosure, CPUs in the CPU topology may be connected using an intermediate node, and the intermediate node may be a CPU and/or an external node controller XNC, for example, the topology structure shown in FIG. 1 or FIG. 6.

In addition, the CPU topology in this embodiment of the present disclosure may include an even quantity (for example, 8 or 6) of CPUs, and accordingly, a CPU topology obtained after removing still has an even quantity of CPUs.

It should be learned that, both the first CPU topology and the second CPU topology are stable topology structures.

In this embodiment of the present disclosure, when the CPU is faulty or needs to be removed, the CPU can be removed in a case in which normal system operating is not affected and the CPU topology obtained after removing remains stable, thereby improving user experience.

For a server that has a non-full mesh CPU topology, the server not only needs to have a continuous serving capability, but also needs to have a flexible expansion capability. The expansion may be: when hardware resources are insufficient or performance is not good enough, increasing hardware resources of the server to expand system resources, so as to improve the server performance. This process is referred to as expansion. The following provides a CPU topology expansion method.

Figure 9:
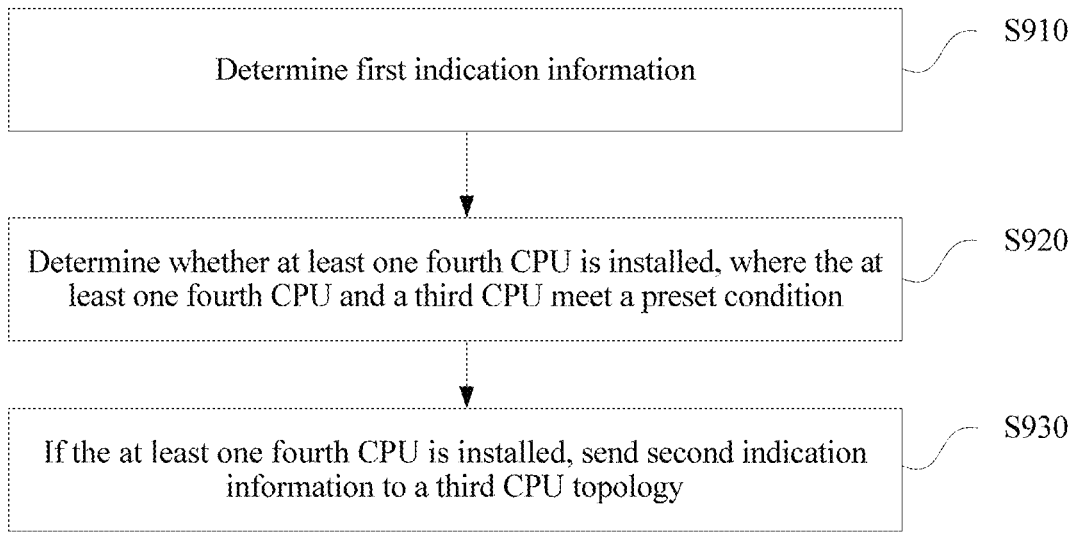
FIG. 9 is a schematic diagram of a central processing unit CPU hot-add method according to an embodiment of the present disclosure.

FIG. 9 is a schematic diagram of a central processing unit CPU hot-add method according to an embodiment of the present disclosure. As shown in FIG. 9, the method may be performed for a multipath server that has a non-full mesh CPU topology. An instruction for the following further steps may be executed by a particular CPU in the non-full mesh CPU topology, or may be executed by another CPU or a controller different from that in the non-full mesh CPU topology, and the instruction required for executing the following steps may be stored in a memory. The method may include the following steps.

S910. Determine first indication information, where the first indication information is used to instruct to add a third CPU, and the third CPU is not in the currently running third CPU topology.

After completing installation of the third CPU, the user may input an instruction using a user interface, and the controller may receive the instruction. The instruction may carry an identifier of the third CPU.

Alternatively, after a CPU that needs to be added is installed, a sensor triggers a particular electrical signal, and the controller may receive the signal, and obtain an identifier of the third CPU according to an indication of the electrical signal. The identifier of the CPU may be information that can identify the CPU, for example, a socket ID. For example, different electrical signals may be triggered using different slots, and a slot in which the CPU is installed may be determined using the electrical signal. Alternatively, electrical signals triggered using different slots may be the same, and after receiving the electrical signal, the server may learn that a new CPU is installed, and may determine an identifier of the newly installed CPU using a service system or a control system.

S920. Determine whether at least one fourth CPU is installed, where the at least one fourth CPU and the third CPU meet a preset condition.

To determine whether the at least one fourth CPU is installed, where the at least one fourth CPU and the third CPU meet the preset condition, the following further implementations may be performed.

Manner 1: A principle of this manner is the same as a principle of Manner 2 in step S720 shown in FIG. 7, and may be understood by referring to Manner 2 in step S720. A further step is as follows: The controller determines whether a fourth CPU that is in a fourth CPU topology and that is in at least one location symmetrical to that of the third CPU is installed.

Manner 2: A principle of this manner is the same as a principle of Manner 3 in step S720 shown in FIG. 7, and may be understood by referring to Manner 3 in step S720. A further step is as follows: The processor may determine whether at least one standby CPU of the third CPU is installed. For example, the fourth CPU topology includes multiple CPU groups, information about the multiple CPU groups may be pre-stored in the server, and the controller determines whether at least one fourth CPU belonging to a same CPU group as the third CPU is installed.

A group of CPUs needs to be added to the third CPU topology, so as to obtain a stable topology. When hot-add indication information is determined, there may be an identifier of only one CPU, and the service system needs to determine an in-position status of another CPU corresponding to the identifier of the CPU; and when both the CPU and the corresponding CPU are installed, the following step is further performed.

S930. If the at least one fourth CPU is installed, where the at least one fourth CPU and the third CPU meet the preset condition, send second indication information to the third CPU topology, where the second indication information is used to instruct to add the third CPU and the at least one fourth CPU, so as to obtain a fourth CPU topology and run the fourth CPU topology.

After receiving the second indication information, the third CPU topology allocates resources to the third CPU and the at least one fourth CPU, and establishes connections from the third CPU and the at least one fourth CPU to a CPU in the third CPU topology; and may further adjust settings of CPUs in the third CPU topology, such that the CPUs in the third CPU topology, the third CPU, and the at least one fourth CPU can operate as the fourth CPU topology.

It should be learned that, both the third CPU topology and the fourth CPU topology are stable topology structures.

In this embodiment of the present disclosure, a capacity of the CPU topology can be expanded without affecting normal system operating, or with reference to the embodiment shown in FIG. 7 and the embodiment shown in FIG. 9, a CPU can be changed, such that a system runs more stably, and user experience is further improved.

The foregoing mainly describes the solutions provided in this embodiment of the present disclosure from a perspective of a data processing procedure of the multipath server. It may be understood that, to achieve the foregoing functions, the server includes a corresponding hardware structure and/or software module for implementing each function. A person of ordinary skill in the art should be easily aware that, the units and algorithm steps in each example described with reference to the embodiments disclosed in this specification may be implemented in a form of hardware or a combination of hardware and computer software in the present disclosure. Whether the functions are implemented by hardware or are implemented in a manner in which computer software drives hardware depends on particular applications and design constraint requirements of the technical solutions. A person skilled in the art may use different methods to implement the described functions for each particular application, but it should not be considered that the implementation goes beyond the scope of the present disclosure.

Figure 10:
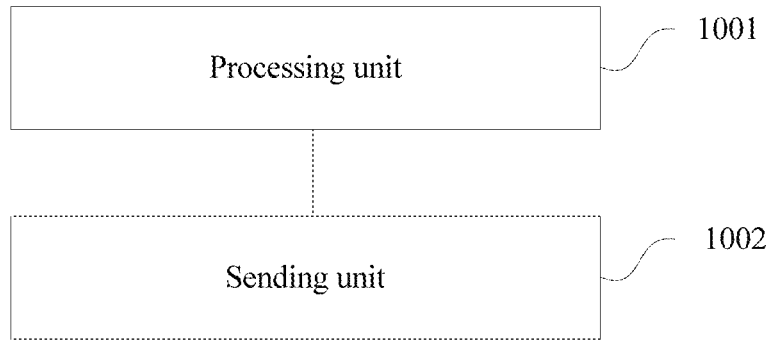
FIG. 10 is a schematic structural diagram of a central processing unit CPU hot-remove apparatus according to an embodiment of the present disclosure.

FIG. 10 is a schematic structural diagram of a central processing unit CPU hot-remove apparatus according to an embodiment of the present disclosure. The apparatus is applicable to a server that has a non-full mesh first CPU topology, the currently running first CPU topology includes multiple CPUs, and the apparatus includes a processing unit 1001, configured to determine a first CPU from the multiple CPUs, where the first CPU is a CPU that is faulty or that needs to be removed according to first indication information, and the first indication information is from the first CPU topology or a user interface. Where the processing unit 1001 is further configured to determine at least one second CPU from the multiple CPUs, where the at least one second CPU and the first CPU meet a preset condition, and a sending unit 1002, configured to send second indication information to the first CPU topology, where the second indication information is used to instruct to remove the first CPU and the at least one second CPU, so as to obtain a second CPU topology and run the second CPU topology.

Optionally, the processing unit 1001 is further configured to determine a location of the first CPU in the first CPU topology, and a second CPU that is in the first CPU topology and that is in at least one location symmetrical to that of the first CPU, or any second CPU that is in at least one location symmetrical to that of the first CPU and that is directly connected to the first CPU.

Optionally, each CPU has multiple ports, the multiple CPUs are connected using the ports, and the processing unit 1001 is further configured to determine at least one second CPU interconnected with the first CPU using ports of a same port number.

Optionally, the processing unit 1001 is further configured to: determine at least one standby second CPU of the first CPU.

Further, the first CPU topology includes multiple CPU groups, information about the multiple CPU groups is pre-stored in the server, and the processing unit 1001 is further configured to determine at least one second CPU belonging to a same CPU group as the first CPU.

Optionally, that the second indication information is used to instruct to remove the first CPU and the at least one second CPU includes the second indication information is used to instruct to reclaim resources from the first CPU and the at least one second CPU, and disconnect the first CPU and the at least one second CPU from a CPU in the second CPU topology.

It should be noted that, this embodiment of the present disclosure is corresponding to the foregoing method embodiment shown in FIG. 7, and reference may be made to each other for understanding. Details are not described.

Figure 11:
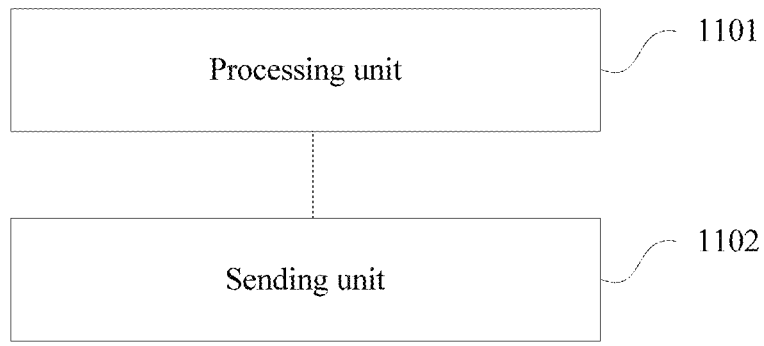
FIG. 11 is a schematic structural diagram of a central processing unit CPU hot-add apparatus according to an embodiment of the present disclosure.

FIG. 11 is a schematic structural diagram of a central processing unit CPU hot-add apparatus according to an embodiment of the present disclosure. The apparatus is applicable to a server that has a non-full mesh third CPU topology, and the apparatus includes a processing unit 1101, configured to determine first indication information, where the first indication information is used to instruct to add a third CPU, and the third CPU is not in the currently running third CPU topology, where the processing unit 1101 is further configured to determine whether at least one fourth CPU is installed, where the at least one fourth CPU and the third CPU meet a preset condition, and a sending unit 1102, configured to: when the at least one fourth CPU is installed, send second indication information to the third CPU topology, where the second indication information is used to instruct to add the third CPU and the at least one fourth CPU, so as to obtain a fourth CPU topology and run the fourth CPU topology.

Optionally, the apparatus further includes a first receiving unit, configured to receive third indication information using a user interface, where the third indication information includes an identifier of the third CPU, or a second receiving unit, configured to receive, using a sensor, fourth indication information triggered when the third CPU is installed; where the processing unit 1101 is further configured to determine the installed third CPU according to the fourth indication information.

Optionally, the processing unit 1101 is further configured to determine whether a fourth CPU that is in the fourth CPU topology and that is in at least one location symmetrical to that of the third CPU is installed.

Optionally, the processing unit 1101 is further configured to determine at least one standby second CPU of the first CPU.

Further, the fourth CPU topology includes multiple CPU groups, information about the multiple CPU groups is pre-stored in the server, and the processing unit 1101 is further configured to determine whether at least one fourth CPU belonging to a same CPU group as the third CPU is installed.

Optionally, that the second indication information is used to instruct to add the third CPU and the at least one fourth CPU includes the second indication information is used to instruct to allocate resources to the third CPU and the at least one fourth CPU, and establish connections from the third CPU and the at least one fourth CPU to a CPU in the third CPU topology, so as to obtain the fourth CPU topology and run the fourth CPU topology.

It should be noted that, this embodiment of the present disclosure is corresponding to the foregoing method embodiment shown in FIG. 9, and reference may be made to each other for understanding. Details are not described.

Figure 12:
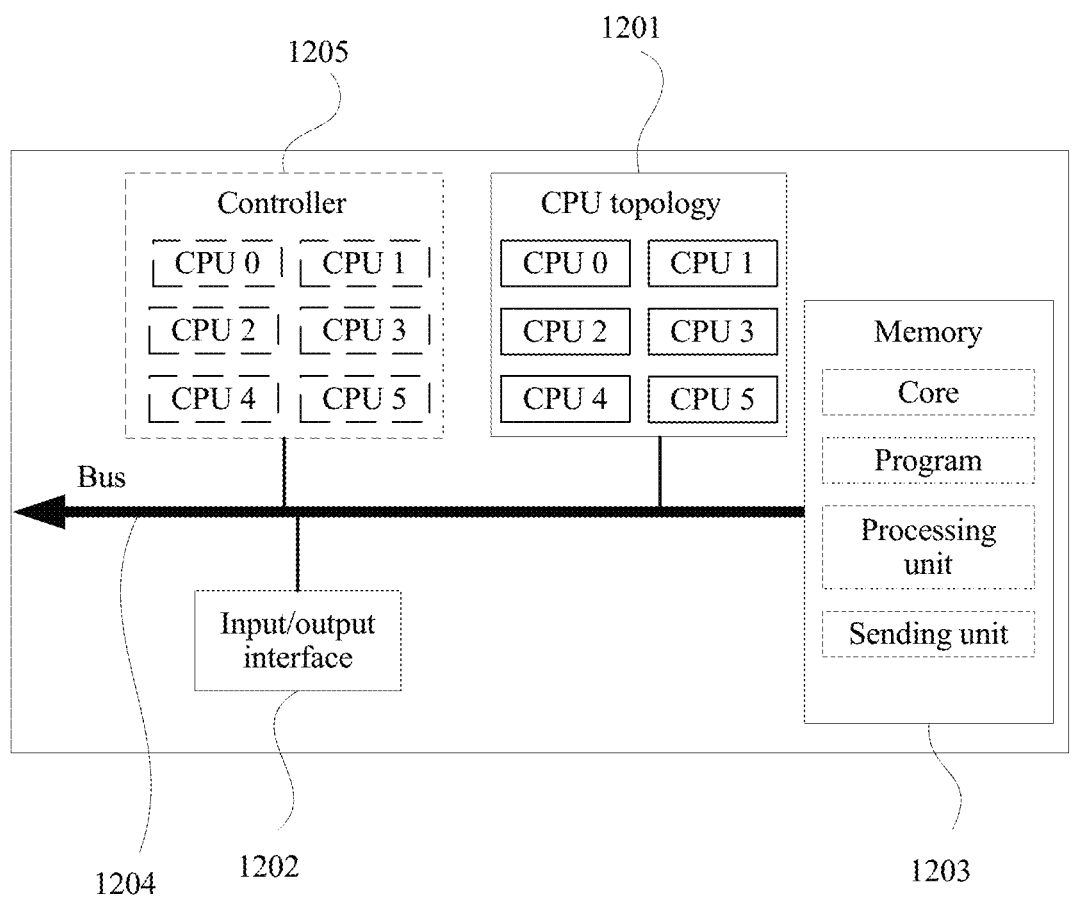
FIG. 12 is a schematic structural diagram of a server that has a CPU topology according to an embodiment of the present disclosure.

FIG. 12 is a schematic structural diagram of a server that has a CPU topology structure according to an embodiment of the present disclosure. The server may include a CPU topology 1201, an input/output interface 1202, and a memory 1203 and a bus 1204 that are further shown in the figure, and may further include a controller 1205. The CPU topology 1201, the input/output interface 1202, the memory 1203, and the controller 1205 are connected and communicate with each other using the bus 1204. The memory 1203 is configured to store a program, and the CPU topology 1201 and the controller 1205 execute the program by reading the program stored in the memory, and send and receive data and an instruction for an external device using the input/output interface 1202.

It should be noted that a CPU topology structure of the CPU topology 1201 herein includes slots, and an independently pluggable CPU is installed in the slot. The slots are connected using an interconnection channel, so as to form a stable topology structure. The multiple CPUs installed in the slots work as a first CPU topology structure.

A CPU corresponding to a to-be-removed CPU generally exists in the first CPU topology, and the slots may be used to distinguish the to-be-removed CPU and the corresponding CPU from another CPU. For example, if the to-be-removed and the CPU corresponding to the to-be-removed CPU are considered as a CPU group, slots belonging to a same slot group may be identified using a same identifier or a same type of identifiers, or a same group of slots may be circled in a same block on a main board, or a same group of slots may be marked using a same color.

The memory 1203 may be a computer readable non-transitory medium that may be one storage apparatus or may be a collective term of multiple storage elements, and is configured to store executable program code in the foregoing steps, or a parameter, data, and the like that are required for running an access network management device. In addition, the memory 1203 may include a random access memory (RAM), or may include a non-volatile memory, such as a magnetic disk memory, a flash.

The bus 1204 may be an industry standard architecture (ISA) bus, a Peripheral Component Interconnect (PCI) bus, an extended industry standard architecture (EISA) bus, or the like. The bus 1204 may be classified into an address bus, a data bus, a control bus, or the like. For ease of representation, only one bold line is used in FIG. 12 for representation, but it does not indicate that there is only one bus or one type of bus.

Figure 13:
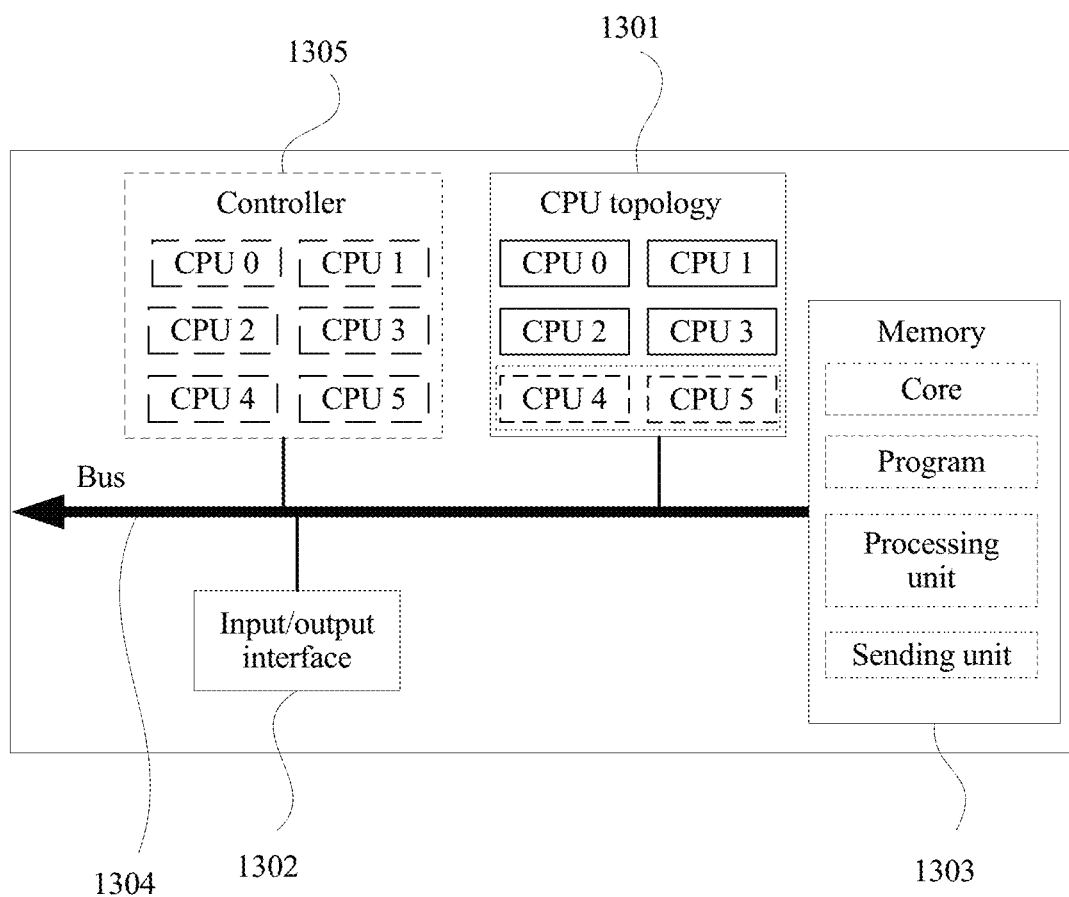
FIG. 13 is a schematic structural diagram of another server that has a CPU topology according to an embodiment of the present disclosure.

FIG. 13 is a schematic structural diagram of another server that has a CPU topology structure according to an embodiment of the present disclosure. The multipath server may include a CPU topology 1301, an input/output interface 1302, and a memory 1303 and a bus 1304 that are further shown in the figure, and may further include a controller 1305. The CPU topology 1301, the input/output interface 1302, the memory 1303, and the controller 1305 are connected and communicate with each other using the bus 1304. It should be noted that a CPU topology structure of the CPU topology 1301 herein includes slots, and an independently pluggable CPU is installed in the slot. The slots are connected using an interconnection channel, so as to form a stable third CPU topology.

A CPU corresponding to a to-be-removed CPU generally exists in a fourth CPU topology, and slots may be reserved in the third CPU topology. A to-be-added CPU and a CPU corresponding to the to-be-added CPU may be installed in the reserved slots. The reserved slots may be distinguished from the slots in the fourth CPU topology. For example, if the to-be-added CPU and the CPU corresponding to the to-be-added CPU are considered as a CPU group, slots belonging to a same slot group may be identified using a same identifier or a same type of identifiers, or a same group of slots may be circled in a same block on a main board, or a same group of slots may be marked using a same color.

The foregoing modules are similar to the modules in FIG. 12, and reference may be made to each other for understanding. Details are not described.

In this embodiment of the present disclosure, CPU hot plug may be implemented without affecting stability of the CPU topology, such that a system can operate normally, thereby improving user experience.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A processing unit hot-remove method, comprising:
   topology comprising multiple CPUs,
   determining, by a controller associated with a first processing unit topology or a server, from multiple processing units of the first processing unit topology, in response to a first processing unit of the multiple processing units needing to be removed from a first processing unit topology according to first indication information, a second processing unit associated in the first processing unit topology with the first processing unit, wherein each processing unit of the multiple processing units in the first processing unit topology has multiple ports, wherein each processing unit of the multiple processing units has a first port, of the multiple ports, that has a first port number and that is connected to only a port, of the multiple ports, of only one first other processing unit of the multiple processing units, that has a same port number as the first port number, and wherein each processing unit of the multiple processing units has a second port, of the multiple ports, that has a second port number and that is connected to only a port, of the multiple ports of only one second other processing unit of the multiple processing units, that has a port number different from the second port number, wherein the first other processing unit is different from the second other processing unit, wherein the second processing unit and the first processing unit meet a preset condition associated with a relationship between the first processing unit and the second processing unit, and wherein the preset condition comprises the first processing unit and second processing unit being connected by ports having same port numbers; and
   sending, by the controller, second indication information to the first processing unit topology, wherein the second indication information instructs the first processing unit topology to remove the first processing unit and the second processing unit, wherein the first processing unit topology removing the first processing unit and the second processing unit results in a second processing unit topology having a third processing unit from the multiple processing unit, other than the first processing unit and other than the second processing unit, that is connected, in the first processing unit topology, to the second port of the first processing unit by a port of the third processing unit having a port number different from the second port number of the second port of the first processing unit, and wherein the second indication information further causes the server to run the second processing unit topology.

2. The method according to claim 1, wherein the first processing unit topology comprises multiple processing unit groups, wherein information about the multiple processing unit groups is pre-stored in the server, and wherein the multiple processing unit groups are associated with processing units of the multiple processing units that are connected by ports of the multiple ports having same port numbers, and
   wherein the determining the at least one second processing unit of the first processing unit topology comprises determining, by the controller, at a second processing unit belonging to a same processing unit group as the first processing unit.

3. The method according to claim 1, wherein the multiple ports of each processing unit of the multiple processing units are quick path interconnect (QPI) ports.

4. The method according to claim 1, wherein the second indication information further instructs the first processing unit topology to reclaim resources from the first processing unit and the second processing unit in the first processing unit topology, and further instructs the first processing unit topology to disconnect the first processing unit and the second processing unit from one or more other processing units of the multiple processing units to form the second processing unit topology.

5. The method according to claim 1, wherein the first processing unit and the second processing unit are connected in series with a first external node controller (XNC) and a second XNC, and wherein the first processing unit is connected directly to the first XNC and the second processing unit is connected directly to the second XNC.

6. A processing unit hot-add method, comprising:
   determining, by a controller of a server running a non-full mesh first processing unit topology, first indication information, wherein the first indication information indicates that the server should add, to the first processing unit topology, a first processing unit that is not in the first processing unit topology, wherein the first processing unit and each processing unit of the first processing unit topology have multiple ports, wherein each processing unit of the first processing unit topology has a first port, of the multiple ports, that has a first port number and that is connected only to a port, of the multiple ports of only one first other processing unit of the first processing unit topology, having a port number that is the same as the first port number, and wherein each processing unit of the multiple processing units has a second port of the multiple ports that has a second port number and that is connected only to a port of the multiple ports, of only one second other processing unit of the first processing unit topology, that has a port number different from the second port number, wherein the one first other processing unit is different from the one second other processing unit;

determining, by the controller, whether a second processing unit is installed, wherein the second processing unit has multiple ports, wherein the first processing unit and the second processing unit meet a preset condition associated with a relationship between the first processing unit and the second processing unit, and wherein the preset condition comprises the first processing unit being connected by the first port of the first processing unit to only the second processing unit and further comprises the first processing unit and second processing unit being connected by ports having the same port number; and sending, by the controller, second indication information to the first processing unit topology in response to determining that the second processing unit is installed, wherein the second indication information instructs the first processing unit topology to add the first processing unit and the second processing unit, wherein the first processing unit topology adding the first processing unit and the second processing unit results in a second processing unit topology having at least one processing unit from the first processing unit topology and further having the first processing unit and the second processing unit, wherein the first processing unit and a third other processing unit in the second processing unit topology, other than the second processing unit, are connected to each other by respective second ports that have different port numbers and that are only connected to each other, and wherein the second processing unit and a fourth other processing unit of the second processing unit topology are connected to each other by respective second ports that have different port numbers and that are only connected to each other, and wherein the second indication information further causes the server to run the second processing unit topology.

7. The method according to claim 6, wherein the determining the first indication information comprises receiving, by the controller, third indication information from a user interface, wherein the third indication information comprises an identifier of the first processing unit.

8. The method according to claim 6, wherein the determining the first indication information comprises receiving, by the controller, using a sensor, second indication information triggered when the first processing unit is installed, and determining the installed first processing unit according to the second indication information.

9. The method according to claim 6, wherein the second processing unit topology comprises multiple processing unit groups, and wherein the multiple processing unit groups are associated with processing units of the multiple processing units that are connected by ports of the multiple ports having same port numbers, wherein information about the multiple processing unit groups is pre-stored in the server, and wherein the determining, by the controller, whether at the second processing unit is installed comprises determining, by the controller, whether at least one second processing unit belonging to a same processing unit group as the first processing unit is installed.

10. The method according to claim 6, wherein the second indication information instructs the first processing unit topology to allocate resources to the first processing unit and the second processing unit, and to establish connections from the first processing unit and the second processing unit to another processing unit in the first processing unit topology to form the second processing unit topology.

11. The method according to claim 6, wherein the first processing unit and the second processing unit are connected in series with a first external node controller (XNC) and a second XNC, and wherein the first processing unit is connected directly to the first XNC and the second processing unit is connected directly to the second XNC.

12. A device, comprising:
a plurality of processing units running a first processing unit topology having multiple units of the plurality of processing units;
an input/output interface;
a controller; and
a bus connecting the first processing unit topology, the input/output interface and the controller;
wherein the controller comprises:
a processing unit; and
a non-transitory computer-readable storage medium storing a program to be executed by the processing unit, the program including instructions to:
determine, from the multiple processing units, in response to a first processing unit from the multiple processing units needing to be removed from the first processing unit topology according to first indication information, a second processing unit associated in the first processing unit topology with the first processing unit, wherein the first indication information is from the first processing unit topology or a user interface, wherein each processing unit of the multiple processing units of the first processing unit topology has multiple ports, wherein each processing unit of the multiple processing units has a first port, of the multiple ports, that has a first port number and that is connected to only a port, of the multiple ports of only one first other processing unit of the multiple processing units, that has a same port number as the first port number, and wherein each processing unit of the multiple processing units has a second port of the multiple ports that has a second port number and that is connected to only a port, of the multiple ports of only one second other processing unit of the multiple processing units, that has a port number different from the second port number, wherein the one first other processing unit is different from the one second other processing unit, wherein the second processing unit and the first processing unit meet a preset condition associated with a relationship between the first processing unit and the second processing unit, and wherein the preset condition comprises the first processing unit and the second processing unit being connected by ports having same port numbers; and send second indication information to the first processing unit topology, wherein the second indication information instructs the first processing unit topology to remove the first processing unit and the second processing unit, wherein the first processing unit topology removing the first processing unit and the second processing unit results in a second processing unit topology having a third processing unit from the multiple processing units other than the first processing unit and other than the second processing unit and that is connected, in the first processing unit topology, to the second port of the first processing unit by a port of the third processing unit having a port number different from the second port number of the second port of the first processing unit, and wherein the second indication information further causes the plurality of processing units to run the second processing unit topology.

13. The device according to claim 12, wherein the first processing unit topology comprises multiple processing unit groups, wherein information about the multiple processing unit groups is pre-stored in a memory of the device, and wherein the multiple processing unit groups are associated with processing units of the multiple processing units that are connected by ports of the multiple ports having same port numbers, and wherein the instructions to determine the second processing unit associated with the first processing unit include instructions to determine at the second processing unit belonging to a same processing unit group as the first processing unit according to the information about the multiple processing unit groups stored in the memory.

14. The device according to claim 12, wherein the multiple ports of each processing unit of the multiple processing units are quick path interconnect (QPI) ports.

15. The device according to claim 12, wherein the second indication information further instructs the first processing unit topology to reclaim resources from the first processing unit and the second processing unit in the first processing unit topology, and further instructs the first processing unit topology to disconnect the first processing unit and the second processing unit from one or more other processing units of the multiple processing units to form the second processing unit topology.

16. The device according to claim 12, wherein the first processing unit and the second processing unit are connected in series with a first external node controller (XNC) and a second XNC, and wherein the first processing unit is connected directly to the first XNC and the second processing unit is connected directly to the second XNC.

17. A device, comprising:
a plurality of processing units running a first processing unit topology having multiple processing units of the plurality of processing units;
an input/output interface;
a controller; and
a bus connecting the first processing unit topology, the input/output interface and the controller;
wherein the controller comprises:
a processing unit; and
a non-transitory computer-readable storage medium storing a program to be executed by the processing unit, the program including instructions to:

determine first indication information, wherein the first indication information indicates that the first processing unit topology should add, to the first processing unit topology, a first processing unit that is not in the first processing unit topology, wherein the first processing unit and each processing unit of the first processing unit topology have multiple ports, wherein each processing unit of the first processing unit topology has a first port, of the multiple port, that has a first port number and that is connected only to a port, of the multiple ports of only one first other processing unit of the first processing unit topology, having a port number that is the same as the first port number, and wherein each processing unit of the multiple processing units has a second port of the multiple ports that has a second port number and that is connected only to a port, of the multiple ports of only one second other processing unit of the first processing unit topology, that has a port number different from the second port number, wherein the one first other processing unit is different from the one second other processing unit;

determine whether a second processing unit is installed, wherein the second processing unit has multiple ports, wherein the first processing unit and the second processing unit meet a preset condition associated with a relationship between the first processing unit and the second processing unit, and wherein the preset condition comprises the first processing unit being connected by the first port of the first processing unit to only the second processing unit and further comprises the first processing unit and second processing unit being connected by ports having the same port number; and sending second indication information to the first processing unit topology in response to determining that the second processing unit is installed, wherein the second indication information instructs the first processing unit topology to add the first processing unit and the second processing unit, wherein the first processing unit topology adding the first processing unit and the second processing unit results in a second processing unit topology having at least one processing unit from the first processing unit topology and further having the first processing unit and the second processing unit, wherein the first processing unit and a third other processing unit in the second processing unit topology, other than the second processing unit, are connected to each other by respective second ports that have different port numbers and that are only connected to each other, and wherein the second processing unit and a fourth other processing unit of the second processing unit topology are connected to each other by respective second ports that have different port numbers and that are only connected to each other, and wherein the second indication information further causes the plurality of processing units to run the second processing unit topology.

18. The device according to claim 17, wherein the second processing unit topology comprises multiple processing unit groups, wherein information about the multiple processing unit groups is pre-stored in a server, and wherein the multiple processing unit groups are associated with processing units of the multiple processing units that are connected by ports of the multiple ports having same port numbers; and wherein the instructions to determine whether the second processing unit is installed includes instructions to determine whether the second processing unit belonging to a same processing unit group as the first processing unit is installed according to the information about the multiple processing unit groups pre-stored in the server.

19. The device according to claim 17, wherein the second indication information instructs the first processing unit topology to allocate resources to the first processing unit and the second processing unit, and to establish connections from the first processing unit and the second processing unit to another processing unit in the first processing unit topology to form the second processing unit topology.

20. The device according to claim 17, wherein the first processing unit and the second processing unit are connected in series with a first external node controller (XNC) and a second XNC, and wherein the first processing unit is connected directly to the first XNC and the second processing unit is connected directly to the second XNC.

* * * * *

UNITED STATES PATENT AND TRADEMARK OFFICE
CERTIFICATE OF CORRECTION

PATENT NO.          : 10,846,186 B2
APPLICATION NO.     : 15/863350
DATED               : November 24, 2020
INVENTOR(S)         : Fei Zhang Page 1 of 1

It is certified that error appears in the above-identified patent and that said Letters Patent is hereby corrected as shown below:

In the Claims

In Column 16, Line 39, Claim 2, delete "at least one".

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*